United States Patent [19]

Alexander

[11] Patent Number: 5,781,765
[45] Date of Patent: Jul. 14, 1998

[54] SYSTEM FOR DATA SYNCHRONIZATION BETWEEN TWO DEVICES USING FOUR TIME DOMAINS

[75] Inventor: Michael C. Alexander, Austin, Tex.

[73] Assignee: Motorola, Inc., Schaumburg, Ill.

[21] Appl. No.: 552,657

[22] Filed: Nov. 3, 1995

[51] Int. Cl.⁶ .................................................. G06F 1/04
[52] U.S. Cl. ...................... 395/551; 395/558; 395/559
[58] Field of Search ........................... 395/551, 558, 395/559, 849, 878, 880, 881

[56] References Cited

U.S. PATENT DOCUMENTS

| | | | |
|---|---|---|---|
| 4,893,271 | 1/1990 | Davis et al. | 364/900 |
| 5,162,667 | 11/1992 | Yasui et al. | 307/272.2 |
| 5,448,715 | 9/1995 | Lelm et al. | 395/550 |
| 5,471,587 | 11/1995 | Fernando | 395/309 |
| 5,600,824 | 2/1997 | Williams et al. | 395/551 |

FOREIGN PATENT DOCUMENTS

| | | | |
|---|---|---|---|
| 0 645 717 A1 | 3/1995 | European Pat. Off. | G06F 13/42 |
| 0 666 541 A1 | 8/1995 | European Pat. Off. | G06F 13/42 |

*Primary Examiner*—Dennis M. Butler

[57] ABSTRACT

A system for data synchronization in a bus interface unit (12) controls the flow of data between data processor (10) operating at a higher clock rate and the address and data buses operating at a lower clock rate. The data synchronization system incorporates circuit paths operating in four different clock domains: core-rate, bus-rate, transfer-rate, and receive-rate. Circuits processing data solely at the higher clock rate of the data processor or the lower clock rate of the address and data buses operate in the core-rate or bus-rate domains, respectively. The transfer-rate domain is used to transfer data from the core-rate to the bus-rate. Conversely, the receive-rate domain is used to transfer data from the bus-rate to the core-rate. The data synchronization system provides a general solution to the problem unreliable half cycle data paths.

5 Claims, 9 Drawing Sheets

SYSTEM FOR DATA SYNCHRONIZATION BETWEEN TWO DEVICES USING FOUR TIME DOMAINS

FIELD OF THE INVENTION

The present invention generally relates to data processing systems, and more specifically to a data synchronization methodology for use with a data processing system.

BACKGROUND OF THE INVENTION

Many data processing systems are designed with subsystems that operate at different clock frequencies. This strategy can increase overall processing throughput by increasing the operating speed of select subsystems relative to the remaining subsystems. Typically, the performance of these faster subsystems is either critical to the overall performance of the system or relatively inexpensive to increase. One example of this design strategy is a data processing system with a single VLSI (very large scale integrated) data processor operating at a clock frequency some multiple times the clock frequency of an associated bus. In this case, most, if not all of the other subsystems in the data processing system operate at the lower bus clock speed. Generally, the ratio of the two clock frequencies may be expressed as the ratio of two integers: 2:1, 3:2, 4:1, etc. The range of these ratios reflects the pragmatic requirement that the two clock signals have some frequent phase alignment in which to synchronize inter-system communications. The more frequent the phase alignment, the greater the number of opportunities to transfer data between the fast data processor and the slower bus.

Data processing systems that have a data processor operating at a different clock frequency than an associated bus must synchronize data transfer between the data processor and the bus. For instance, in a 2:1 processor-bus system, it may be the case that the data processor does not assert an output signal during the correct phase of the bus signal if the data processor only asserts the signal for one processor clock cycle.

Conversely, the bus will assert an input signal to the data processor for two processor clock cycles. Both of these scenarios result in unreliable data transfers. In the first case, data may not be transferred from the data processor to the bus at all. In the second case, the bus will transfer the same data twice to the data processor.

Known synchronization methods have limitations. In general, data transfer methods may be described as asynchronous or synchronous. Each of these methods has a different synchronizing problem.

In the asynchronous case, there are no timing requirements between two communicating subsystems other than minimum signal hold times. In one known solution, a slow output signal is sampled by a fast input device through a series of sequential latching elements. The clocking signal of the faster input device clocks each of the latching elements. Each successive latching element reduces the probability that a metastable state will be passed from the slower device to the faster device. Unfortunately, each additional latch increases the propagation time from subsystem to subsystem by an additional fast clock cycle.

In the synchronous case, there are timing requirements between the two communicating subsystems. In particular, a signal must be asserted during a particular phase of the clock signal of the receiving device. In a second known solution, a single latching element-multiplexer circuit links two subsystems operating at different clock frequencies. The latching element samples the output of the multiplexer coincident with each fast clock cycle. The multiplexer outputs either a previously latched value or an input signal. The output of the multiplexer is selected by a control signal such that it passes each input signal according to the timing constraints of the receiving subsystem. Typically, the receiving subsystem clock signal is generated by "swallowing" N-1 clock pulses of the faster clock signal, where the ratio of the processor to bus clock frequency is N:1. This solution is a robust only where the ratio of the two clock frequencies is an integer. Otherwise, this solution permits a half-cycle transfer every other bus cycle when N equals 1.5, 2.5, etc. In addition, a particular solution is typically only valid for one processor to bus clock ratio.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
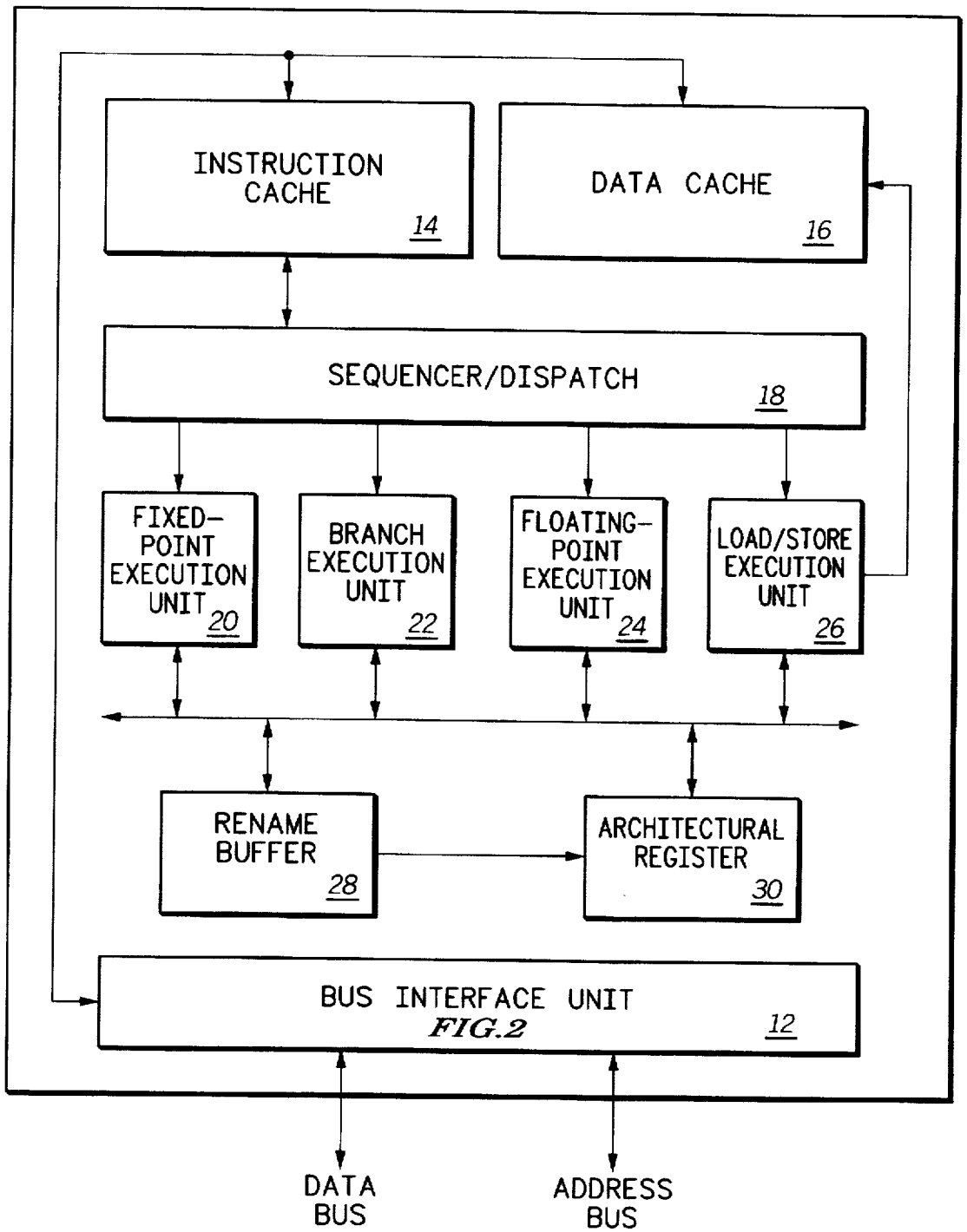
FIG. 1 depicts a block diagram of a data processor constructed in accordance with the present invention.

FIG. 1 depicts a block diagram of a data processor 10 constructed in accordance with the present invention. As depicted, data processor 10 has a bus interface unit 12 (hereafter simply BIU 12). BIU 12 controls the flow of data between data processor 10 and the address and control buses that connect data processor 10 to other data processing components (not shown). Data processor 10 and BIU 12 operate at a clock speed greater than the clock speed of the associated buses. As described above in the Background of the Invention, this clocking scheme improves the performance of a data processing system incorporating data processor 10. Also according to the disclosed invention, BIU 12 provides a general solution to the synchronization problem caused by a processor clock rate some multiple times the bus clock rate. This solution allows a single data processor model to be useful with a wide variety of bus frequencies. Furthermore, the disclosed invention does not introduce unnecessary delays into the flow of data between the data processor and the associated buses nor does it permit unreliable half cycle data paths: problems previously associated with asynchronous and synchronous data transfer systems.

Continuing with FIG. 1, BIU 12 is connected to an instruction cache 14 and to a data cache 16. Instruction cache 14 supplies an instruction stream to sequencer/ dispatch unit 18. Sequencer/dispatch unit 18 forwards individual instructions to an appropriate execution unit block. Data processor 10 has a fixed point execution unit 20, a branch execution unit 22, a floating point execution unit 24, and a load/store execution unit 26. These execution unit blocks are connected to a rename buffer 28 and to architectural register file 30.

The operation of data processor 10 without the disclosed synchronization method and system therefor is known in the art. In general, sequencer/dispatch unit 18 issues individual instructions to the various execution units 20, 22, 24 and 26. Each of the execution units performs one or more instructions of a particular class of instructions. The particular class of instructions of each execution unit is indicated by the name of the execution unit. For instance, branch execution unit 22 executes branch instructions. Execution unit blocks 20, 22, 24 and 26 return the results of their operations to designated entries in rename buffer 28. Rename buffer 28 updates the values in architectural register file 30 according to a known protocol not relevant to the present invention. Rename buffer 28 and architectural register file 30 supplies operands to execution unit blocks 20 through 26.

The operation of data processor 10 with a data synchronization method and system therefor is described below in connection with FIGS. 2 through 13. In general, data processor 10 and the address and data buses follow a communications protocol that allows data communications without any synchronizing methods or systems at a 1:1 data processor clock frequency to bus clock frequency. For instance, a signal asserted on either bus during a particular phase of the bus clock for a particular duration will be properly latched by data processor 10 at the occurrence of the next particular edge transition when the data processor and bus operate at the same frequency. In addition, data processor 10 and the address and data buses follow a "handshake" communications protocol. A handshake communications protocol is one in which any clock cycle of a protocol participant can be used for any type of data protocol operation. A set of logic signals asserted on a set of control signals between the protocol participants determines which operation if any takes place during each clock cycle. The particular protocol is not part of the disclosed invention. It is generally advantageous to operate data processor 10 at as high a clock frequency as possible. However, it may not be economical or even possible to operate the address and data buses at the same high clock frequency. The disclosed data synchronization system may be incorporated in such a system.

Figure 2:
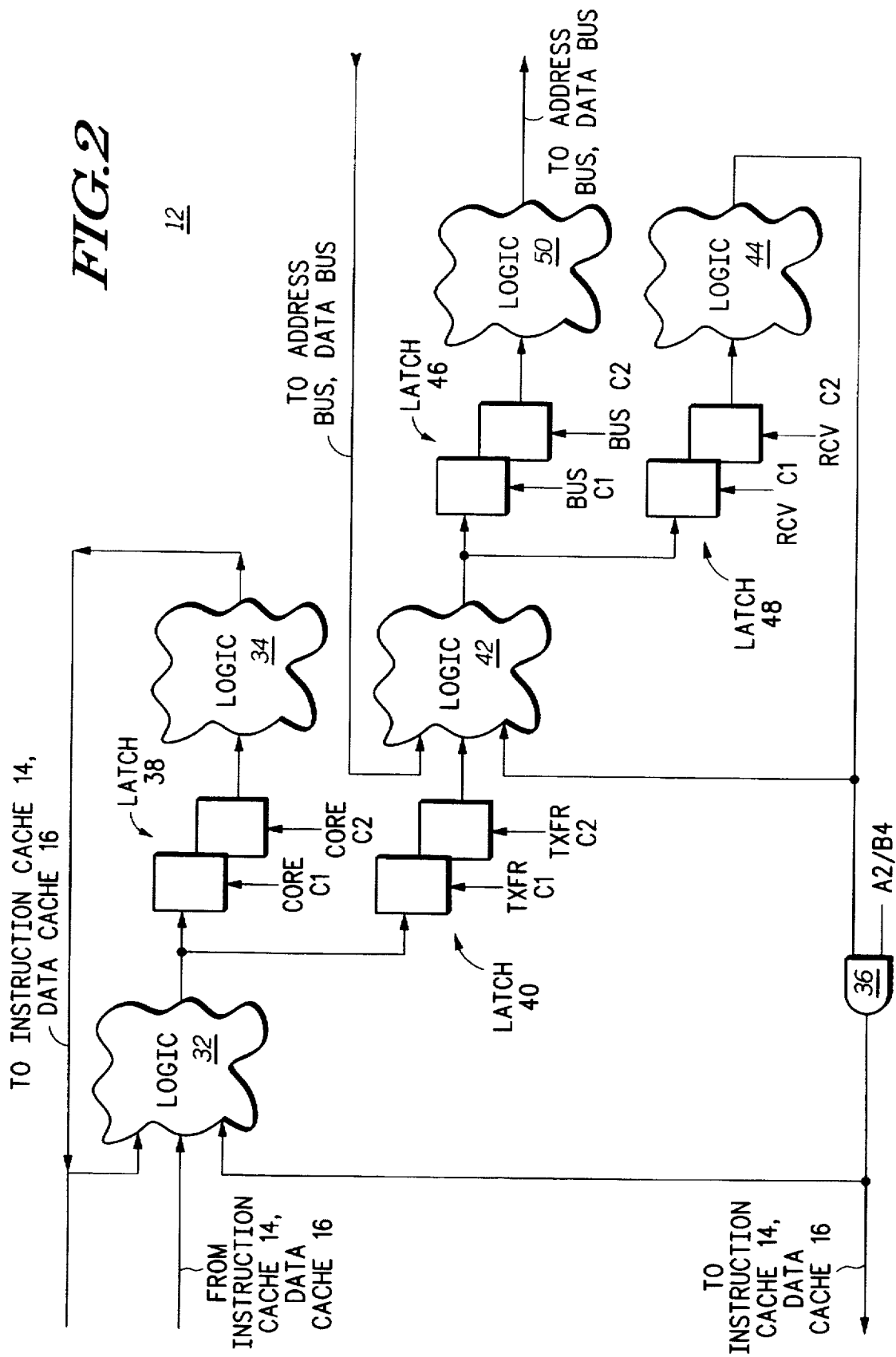
FIG. 2 depicts a block diagram of a portion of the bus interface unit depicted in FIG. 1.

FIG. 2 depicts a block diagram of a portion of BIU 12 depicted in FIG. 1. It should be understood that FIG. 2 depicts a single bit path in BIU 12. One skilled in the art will realize that there are many other individual bit paths in BIU 12 not so depicted. Furthermore, FIG. 2 depicts generic logic blocks to more clearly describe the disclosed invention and not the various features of BIU 12. These features are implementation dependent and not part of the disclosed invention. One skilled in the art will realize that each bit path has associated with it specific logic functions and, hence, specific logic blocks. And, although not every bit path will contain every portion of FIG. 2, the general topology of each bit path is the same. Also, one skilled in the art will realize that many of the individual bit paths are interconnected within the generic logic blocks.

In general, BIU 12 processes data between data processor 10 and the address and data buses according to four time domains: core-rate domain ("CORE"), transfer-rate domain ("TXFR"), bus-rate domain ("BUS"), and receive-rate domain ("RCV"). In a complimentary metal oxide semiconductor ("CMOS") implementation, master-slave latches are used to hold intermediate results between logic stages and as input/output buffers. The master portion of a CMOS master-slave latch is controlled by a signal typically referred to as a C1 pulse. The assertion of the C1 pulse causes the master portion to capture data input to the latch. The slave portion of a CMOS master-slave latch is controlled by a signal typically referred to as a C2 pulse. The assertion of the C2 pulse causes the slave portion to launch the data input captured during the previous C1 pulse to the output of the latch. According to the disclosed invention, there is a separate C1 and C2 control signal for each of the four clock domains.

The core-rate domain is the normal clock domain for data processor 10. It clocks once every cycle of a globally distributed clock ("GCLK"). The low phase of GCLK is filtered through to generate the control signal CORE C1. The high phase of GCLK is filtered through to generate the control signal CORE C2. The vast majority of data processor 10 operates according to the core-rate domain. BIU 12 contains circuitry operating in the core-rate domain to receive information from the rest of data processor 10, process the information, and return it to the rest of data processor 10.

The transfer-rate domain clocks once every cycle of the core-rate except when the core-rate only clocks one-half cycle before the beginning of a bus clock cycle. In these cases, the rising edge of a bus-rate clock coincides with the falling edge of a core-rate clock. Here, both TXFR C1 and TXFR C2 are filtered out. BIU 12 contains circuitry operating in the transfer-rate domain to receive information from the rest of data processor 10, process the information, and send it to the portion of BIU 12 operating in the bus-rate domain. The transfer-rate domain prevents data from being transferred to the bus during the "half-cycle" path occurring in non-integer core:bus clock ratios. In other embodiments of the disclosed invention, it may be possible to simply delay TXFR C2 until the next occurrence of CORE C2 in the half-cycle scenarios. In this alternate embodiment, the TXFR C1 pulse occurring immediately after the rising edge of the bus-rate clock must be deleted.

The bus-rate domain is the normal clock domain for the address and data buses. As described above, the bus-rate domain clocks an integer times slower or and integer plus one-half times slower than the core-rate domain for performance reasons. The frequency of the bus-rate domain is usually represented by a system clock ("SYSCLK") input to a phase locked loop ("PLL") of data processor 10. Certain low phases of GCLK are filtered through to generate the control signal BUS C1. Certain high phases of GCLK are filtered through to generate the control signal BUS C2. The particular phases so filtered are described below in connection with FIGS. 7 and 8. BIU 12 contains circuitry operating in the bus-rate domain to receive information from the address and data buses, process the information, and return it to the address and data buses.

The receive-rate domain clocks once every cycle of the bus-rate domain except when the core-rate only clocks one-half cycle before the beginning of a bus clock cycle. In these cases, RCV C2 is delayed until it can be aligned with a CORE C2 pulse. BIU 12 contains circuitry operating in the receive-rate domain to sample data from the address and data buses as soon as possible. However, BIU 12 does not launch the data to the core of data processor 10 until a complete core clock cycle begins.

Continuing with FIG. 2, a logic block 32 receives a single input bit from the output of a logic block 34, from instruction cache 14 and/or data cache 16, and from an output of an AND gate 36. An output of logic block 32 is coupled to an input of a master-slave latch (labeled and hereafter "latch") 38 and to an input of a latch 40. A master portion of latch 38 is clocked by the control signal CORE C1. A slave portion of latch 38 is clocked by a control signal CORE C2. An output of slave portion of latch 38 is coupled to logic block 34. Latch 38 is described below in connection with FIG. 3. A master portion of latch 40 is clocked by the control signal TXFR C1. A slave portion of latch 40 is clocked by a control signal TXFR C2. An output of slave portion of latch 38 is coupled to a logic block 34.

A logic block 42 receives a single input bit from the output of the slave portion of latch 40, from the address bus and/or data bus, and from an output of a logic block 44. An output of logic block 42 is coupled to an input of a latch 46 and to an input of a latch 48. A master portion of latch 46 is clocked by the control signal BUS C1. A slave portion of latch 46 is clocked by a control signal BUS C2. An output of slave portion of latch 46 is coupled to a logic block 50. Logic block 50 outputs the single bit to the address and data buses. A master portion of latch 48 is clocked by the control signal RCV C1. A slave portion of latch 48 is clocked by a control signal RCV C2. An output of slave portion of latch 38 is coupled to logic block 44. The output of logic block 44 is also coupled to a first input of AND gate 36. A second input of AND gate 36 receives the control signal A2/B4. The control signal A2/B4 masks all but a first portion of the output of logic block 44. This first portion coincides with the first CORE C1 and CORE C2 pulse occurring after latch 48 launches its output to logic block 44. The generation of control signal A2/B4 is described below in connection with FIG. 7.

Figure 3:
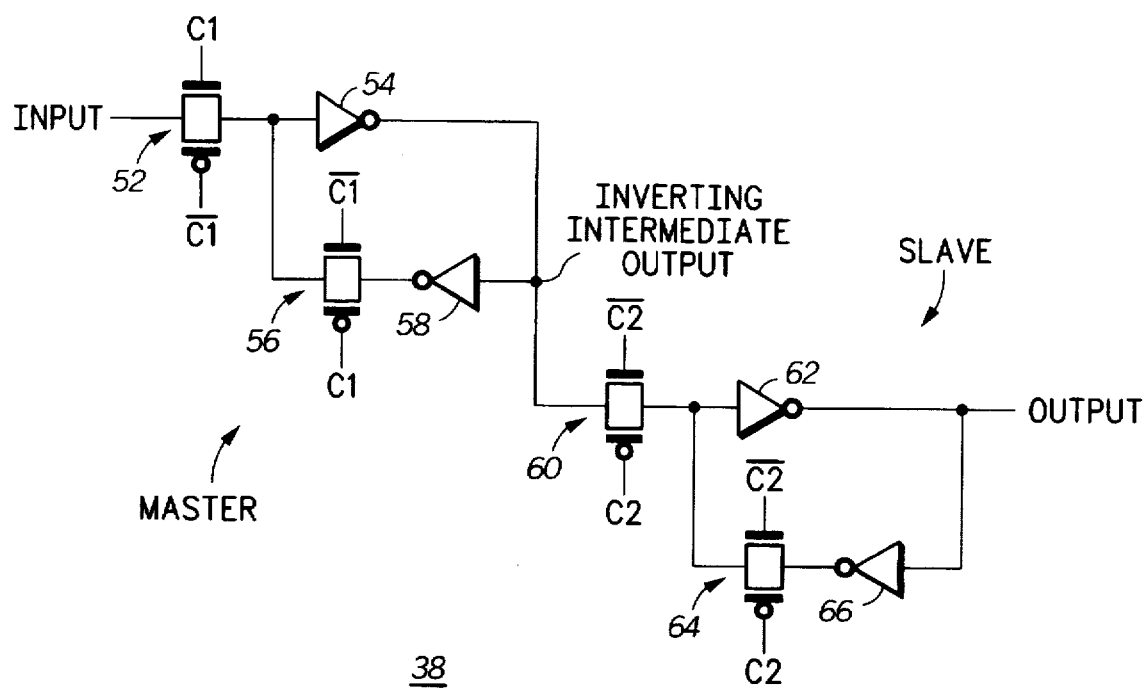
FIG. 3 depicts a circuit diagram of a master-slave latch depicted in FIG. 2 and elsewhere.

FIG. 3 depicts a circuit diagram of a master-slave latch 38 depicted in FIG. 2 and elsewhere. One skilled in the art will realize that latch 38 is identical to every other latch depicted in FIG. 2 with the exception of the different clock inputs. Consequently, in FIG. 2, the control signals are abbreviated to "C1" and "C2" to generalize the usefulness of the drawing in the understanding of the invention.

A master portion of latch 38 receives a data input coupled to a first terminal of a pass gate 52. A second terminal of pass gate 52 is connected to an input of an inverter 54 and to a first terminal of a pass gate 56. An output of inverter 54 is coupled to an input of an inverter 58. An output of inverter 58 is connected to a second terminal of pass gate 56. A control electrode of an n-type device and of a p-type device of pass gate 52 receive the control signal C1 and a logical complement of the control signal C1, labeled C1, respectively. A control electrode of a p-type device and of an n-type device of pass gate 56 receive C1 and C1, respectively. The output of inverter 54 generates an intermediate output, labeled "INVERTING INTERMEDIATE OUTPUT." The intermediate output is the logical complement of the input and is output after one C1 pulse. In the normal core-rate or bus-rate domains, the intermediate output passes after one-half clock cycle.

A slave portion of latch 38 receives the intermediate output coupled to a first terminal of a pass gate 60. A second terminal of pass gate 60 is connected to an input of an inverter 62 and to a first terminal of a pass gate 64. An output of inverter 62 is coupled to an input of an inverter 66. An output of inverter 66 is connected to a second terminal of pass gate 64. A control electrode of an n-type device and of a p-type device of pass gate 60 receive the control signal C2 and a logical complement of the control signal C2, labeled $\overline{C2}$, respectively. A control electrode of a p-type device and of an n-type device of pass gate 64 receive C2 and $\overline{C2}$, respectively. The output of inverter 62 generates an final output, labeled "OUTPUT." The intermediate output is the logical complement of the intermediate output and is output after one C2 pulse. In the normal core-rate or bus-rate domains, the input passes through the master portion and the slave portion of latch 38 after complete clock cycle.

Figure 4:
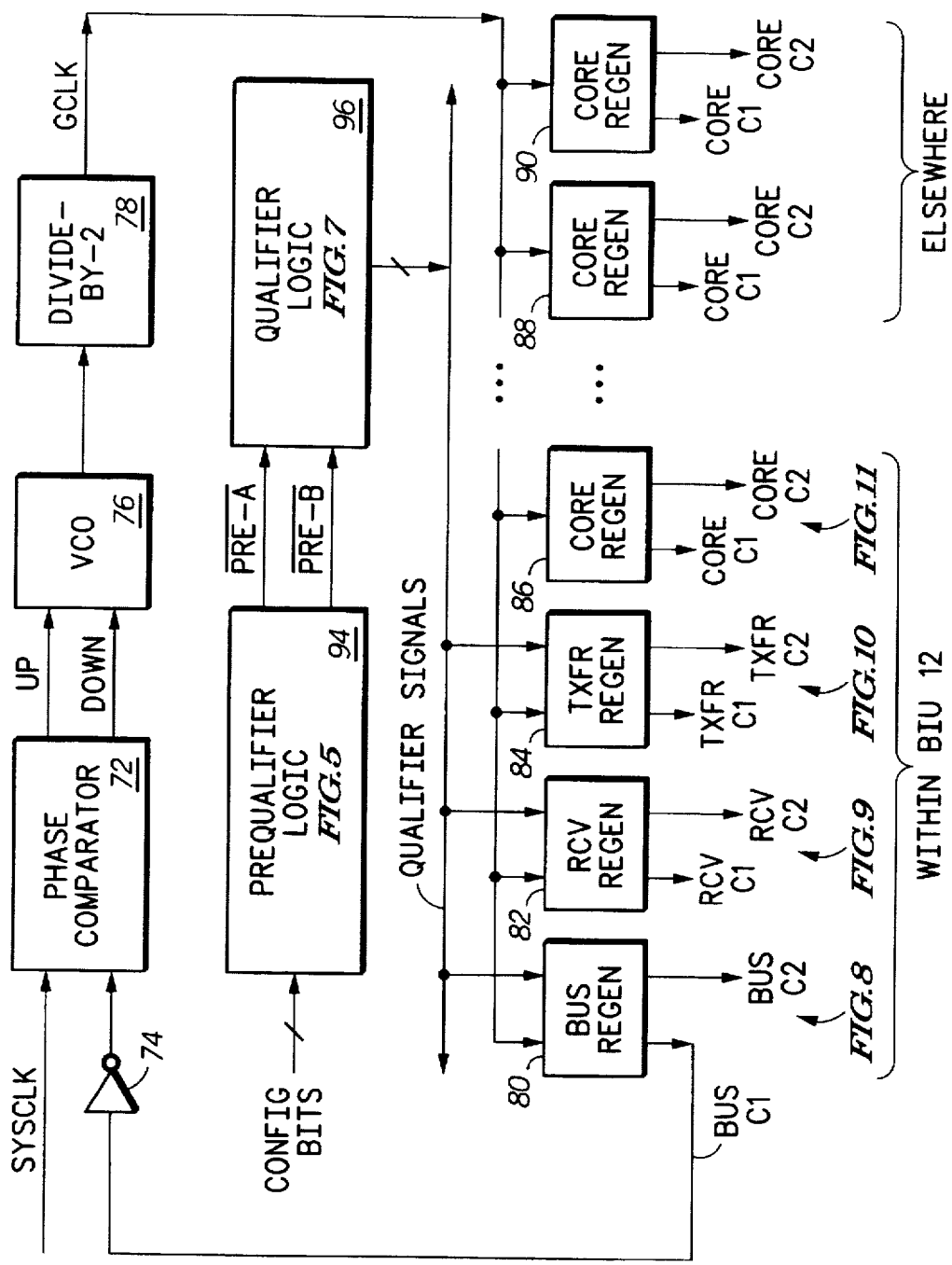
FIG. 4 depicts a phase locked loop operable to generate the control signals input to the bus interface unit depicted in FIG. 2.

FIG. 4 depicts a phase locked loop ("PLL") 70 operable to generate the control signals input to BIU 12 depicted in FIG. 2. A phase comparator 72 receives an output of an inverter 74 and the bus-rate domain clock SYSCLK. As described above, SYSCLK is the address and data bus clock signal input to data processor 10 for synchronization purposes. Phase comparator 72 compares the phase of the clock signal output by inverter 74 at each rising edge of SYSCLK. If the phase of SYSCLK leads the output of inverter 74, then phase comparator 72 asserts the control signal UP. If the phase of SYSCLK lags the output of inverter 74, then phase comparator 72 asserts the control signal DOWN.

A voltage controlled oscillator ("VCO") 76 receives the control signals UP and DOWN and generates a periodic clocking signal two times the frequency of the clock signal, GCLK. As described above, GCLK is the clocking signal distributed throughout data processor 10. Typically, VCO 76 contains a node (not shown) which is charged or discharged by the assertion of UP and DOWN, respectively. The voltage of this node is then used to control the frequency of the output clock signal. In one embodiment, this voltage is used to control the application of one or more power supplies to a ring oscillator. The output of VCO 76 is coupled to a divide-by-two circuit 78. Divide-by-two circuit 78 reduces the frequency of the clock signal output by VCO 76 by a factor of two. This division ensures an even duty cycle of GCLK (low phase and high phase are equal in length).

As described above, the clock signal GCLK is distributed throughout data processor 10. For purposes of minimizing clock skew within data processor 10, a number of clock regenerators are used to buffer GCLK from the various latches, shown in FIG. 2. In one embodiment, approximately 300 clock regenerators buffer GCLK from these various latches. However not all latches are clocked in the same time domain. The four different time domains of the present invention are described above in connection with FIG. 2.

Within BIU 12, there are four types of clock regenerators. The number of each type will depend upon the complexity of BIU 12 and the width of the address and data buses. For purposes of illustration, only one instantiation of each type of regenerator is depicted. A bus regenerator (labeled "BUS REGEN") 80 generates the clock pulses BUS C1 and BUS C2 from GCLK and from at least one of a group of QUALIFIER SIGNALS. The group of QUALIFIER SIGNALS is described below in connection with FIG. 7. The BUS C1 output of one bus regenerator 80 is coupled to an input of inverter 74. The output of inverter 74 is used by phase comparator 72 to synchronize the various clock domains with SYSCLK. Bus regenerator 80 is further described below in connection with FIG. 8. A receive regenerator (labeled "RCV REGEN") 82 generates the clock pulses RCV C1 and RCV C2 from GCLK and from at least one of a group of QUALIFIER SIGNALS. Receive regenerator 82 is further described below in connection with FIG. 9. A transfer regenerator (labeled "TXFR REGEN") 84 generates the clock pulses TXFR C1 and TXFR C2 from GCLK and at least one of a group of QUALIFIER SIGNALS. Transfer regenerator 84 is further described below in connection with FIG. 10. A core regenerator (labeled "CORE REGEN") 86 generates the clock pulses CORE C1 and CORE C2 from GCLK. Core regenerator 86 is further described below in connection with FIG. 11.

Most of the clock regenerators within data processor 10 generate the clock pulses CORE C1 and CORE C2 for the non-BIU circuits. FIG. 4 depicts two of these core regenerators (labeled "CORE REGEN") 88 and 90.

A prequalifier logic block 94 receives the CORE C1 and CORE C2 clock signals and the input signals CONFIG BITS to generate the control signals $\overline{\text{PRE-A}}$ and $\overline{\text{PRE-B}}$. (It is a convention in the engineering community to indicate an active low signal by the use of an overscore.) CONFIG BITS allow the user of data processor 10 to set the ratio of the frequency of GCLK to the ratio of SYSCLK. They may be directly input to data processor 10 through several dedicated input/output pins or may stored in a register accessible to the user by the execution of an instruction. Prequalifier logic block 94 is described below in connection with FIG. 5. The control signals $\overline{\text{PRE-A}}$ and $\overline{\text{PRE-B}}$ are coupled to a qualifier logic block 96. Qualifier logic block 96 generates the group of QUALIFIER SIGNALS used bus regenerator 80, receive regenerator 82, and transfer regenerator 84.

Figure 5:
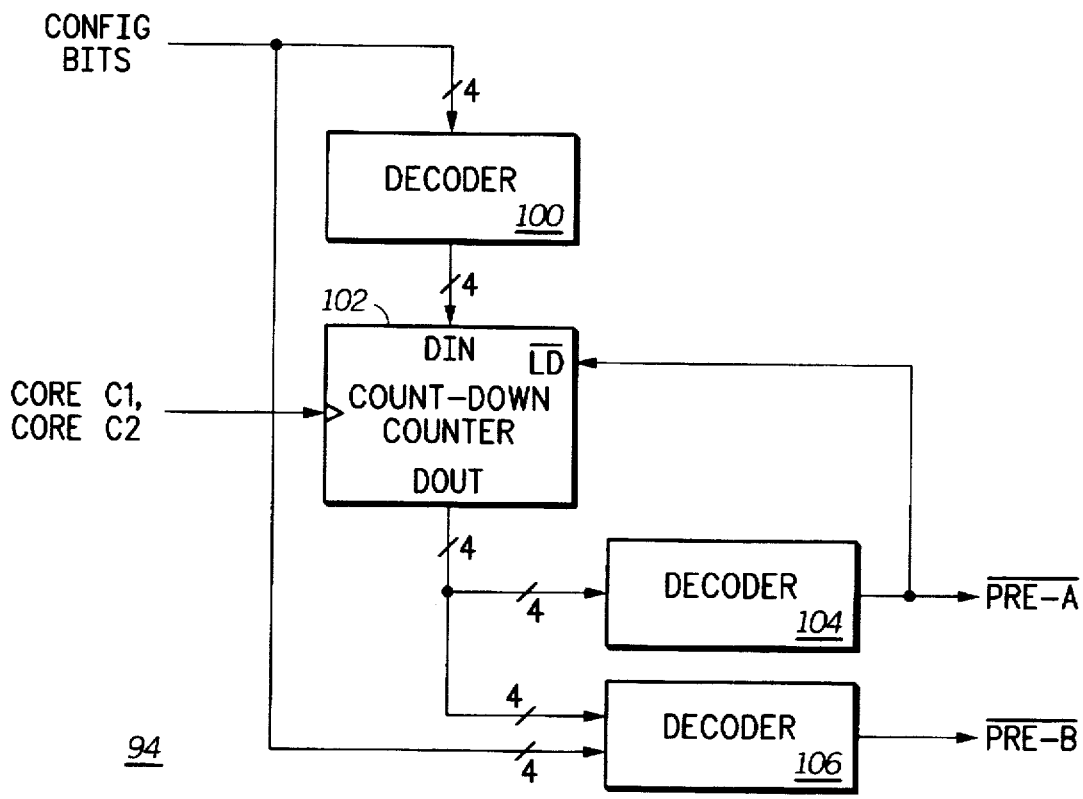
FIG. 5 depicts a block diagram of the prequalifier logic block depicted in FIG. 4.

FIG. 5 depicts a block diagram of prequalifier logic block 94 depicted in FIG. 4. A first decoder block 100 decodes the four CONFIG BITS into a binary number. As described above, the CONFIG BITS specify the ratio of the core to bus clock frequencies. If the CONFIG BITS are set to specify an integer bus mode, such as 1:1, 2:1, 3:1, . . . , N:1, then decoder block 100 outputs the number N-1 in binary format. If the CONFIG BITS are set to specify an integer plus one-half bus mode, such as 1.5:1, 2.5:1, 3.5:1, . . . , N+0.5:1, then decoder block 100 outputs the number 2N in binary format.

The decoded output of decoder block 100 is coupled to a data input ("DIN") of a count-down counter 102. Count-down counter 102 loads the decoded output when its load input ($\overline{\text{LD}}$) is asserted. Count-down counter 102 counts down from the input number to zero at the rate of one number per core or GCLK cycle. The current count value of count-down counter 102 is constantly output via DOUT to a second decoder block 104 and to a third decoder block 106. The CONFIG BITS are also input to decoder block 106. Decoder blocks 104 and 106 generate the signals $\overline{\text{PRE-A}}$ and $\overline{\text{PRE-B}}$, respectively. The signal $\overline{\text{PRE-A}}$ is coupled to the load input of count-down counter 102.

Figure 6:
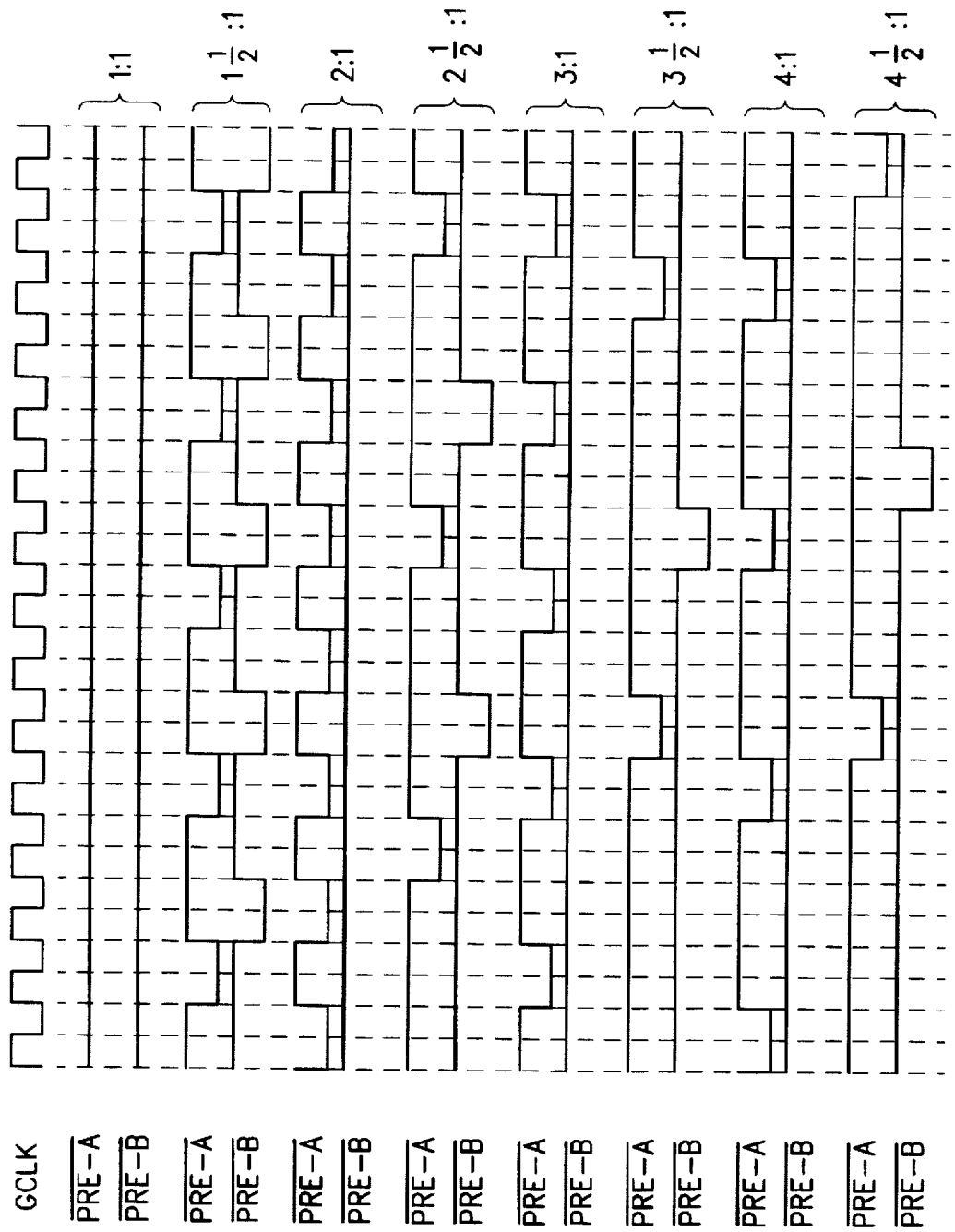
FIG. 6 depicts a timing diagram illustrating the operation of the prequalifier logic block depicted in FIG. 5.

FIG. 6 depicts a timing diagram illustrating the operation of prequalifier logic block 94 depicted in FIG. 5. Decoder block 104 outputs a voltage corresponding to a low logic state as $\overline{\text{PRE-A}}$ when DOUT equals zero. Decoder block 104 outputs a voltage corresponding to a high logic state as $\overline{\text{PRE-A}}$ when DOUT equals a number other than zero. The low assertion of $\overline{\text{PRE-A}}$ causes count-down counter 102 to reset to the number output by decoder block 100 and begin counting down again. Consequently, $\overline{\text{PRE-A}}$ appears to have a periodicity of N times the GCLK in the integer bus modes or 2N+1 times the GCLK in the integer plus one-half bus modes. In the case of the 1:1 bus mode, PRE-A remains in a low logic state.

When the CONFIG BITS specify an integer bus mode, decoder block 106 outputs a constant voltage corresponding to a high logic state as $\overline{\text{PRE-B}}$. When the CONFIG BITS specify an integer plus one-half bus mode, decoder block 106 outputs a varying voltage level as $\overline{\text{PRE-B}}$. In these latter cases, decoder block 106 outputs a voltage corresponding to a low logic state as $\overline{\text{PRE-B}}$ N cycles after decoder block 104 outputs a low logic state as $\overline{\text{PRE-A}}$, where the core to bus ratio is defined as N+0.5: 1. Decoder block 106 outputs a voltage corresponding to a high logic state at all other times.

In one embodiment of the disclosed invention, it is advantageous to decode the number output by count-down counter 102 rather than to delay the signal $\overline{\text{PRE-A}}$ by a certain number of cycles. This strategy yields a simpler general solution. In this embodiment, decoder block 106 outputs a voltage corresponding to a low logic state as $\overline{\text{PRE-B}}$ when (1) the CONFIG BITS specify 1.5:1 and the number output by count-down counter 102 equals 2, or (2) the CONFIG BITS specify 2.5:1 and the number output by count-down counter 102 equals 3, or (3) the CONFIG BITS specify 3.5:1 and the number output by count-down counter 102 equals 4, or (4) the CONFIG BITS specify 4.5:1 and the number output by count-down counter 102 equals 5. In general, decoder block 106 outputs a voltage corresponding to a low logic state as $\overline{\text{PRE-B}}$ when the CONFIG BITS specify N+0.5:1 and the number output by count-down counter 102 equals N+1.

Figure 7:
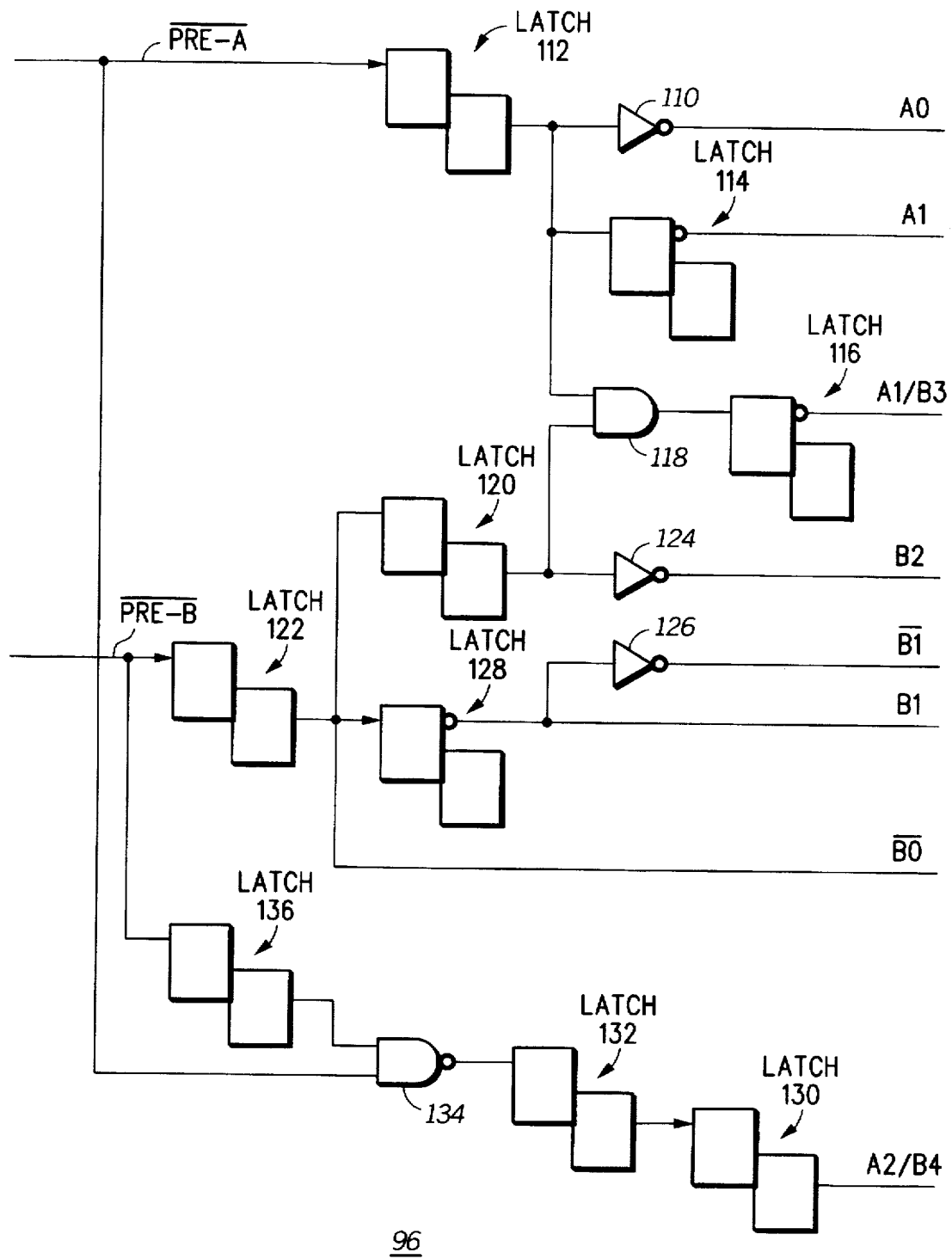
FIG. 7 depicts a block diagram of the qualifier logic block depicted in FIG. 4.

FIG. 7 depicts a block diagram of qualifier logic block 96 depicted in FIG. 4. Qualifier logic block 96 generates the group of QUALIFIER SIGNALS used by bus regenerator 80, receive regenerator 82, and transfer regenerator 84. An output of an inverter 110 generates a qualifier signal A0. An input of inverter 110 is coupled to a data output of a latch 112. An input of latch 112 receives $\overline{\text{PRE-A}}$. An inverting intermediate output of a latch 114 generates a qualifier signal A1. An input of latch 114 is coupled to the output of latch 112. An inverting intermediate output of a latch 116 generates a qualifier signal A1/B3. An input of latch 116 is coupled to an output of an AND gate 118. A first input of AND gate 118 is coupled to the output of latch 112. A second input of AND gate 118 is coupled to an output of a latch 120. An input of latch 120 is coupled to an output of a latch 122. An input of latch 122 receives $\overline{\text{PRE-B}}$. An output of an inverter 124 generates a qualifier signal B2. An input of inverter 124 is coupled to the output of latch 120. An output of an inverter 126 generates a qualifier signal $\overline{\text{B2}}$. An input of inverter 126 is coupled to an inverting intermediate output of a latch 128. An input of latch 128 is coupled to the output of latch 122. The inverting intermediate output of latch 128 also generates a qualifier signal B1. The output of latch 122 generates the qualifier signal $\overline{\text{B0}}$. An output of a latch 130 generates a qualifier signal A2/B4. An input of latch 130 is coupled to an output of a latch 132. An input of latch 132 is coupled to an output of a NAND gate 134. A first input of NAND gate 134 is coupled to an output of a latch 136. An input of a latch 136 receives $\overline{\text{PRE-B}}$. A second input of NAND gate 134 receives $\overline{\text{PRE-A}}$.

FIGS. 8 through 11 depict, respectively, circuit diagrams of bus regenerator 80, receive regenerator 82, transfer regenerator 84, and core regenerator 86 depicted in FIG. 4. One skilled in the art will realize that the circuits depicted in FIGS. 8 through 11 are identical with the exception of the various inputs.

Figure 8:
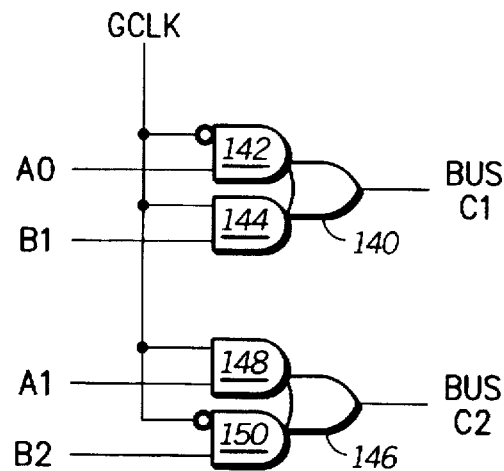
FIGS. 8 through 11 depict, respectively, circuit diagrams of the bus regenerator, receive regenerator, transfer regenerator and core regenerator depicted in FIG. 4.

In FIG. 8, an output of an OR gate 140 generates the signal BUS C1. A first input of OR gate 140 is coupled to an output of an AND gate 142. A second input of OR gate 140 is coupled to an output of an AND gate 144. A first and a second input of AND gate 142 receive the logical complement of GCLK and A0, respectively. A first and a second input of AND gate 144 receive GCLK and B 1, respectively. An output of an OR gate 146 generates the signal BUS C2. A first input of OR gate 146 is coupled to an output of an AND gate 148. A second input of OR gate 146 is coupled to an output of an AND gate 150. A first and a second input of AND gate 148 receive GCLK and A1, respectively. A first and a second input of AND gate 150 receive the logical complement of GCLK and B2, respectively.

Figure 9:
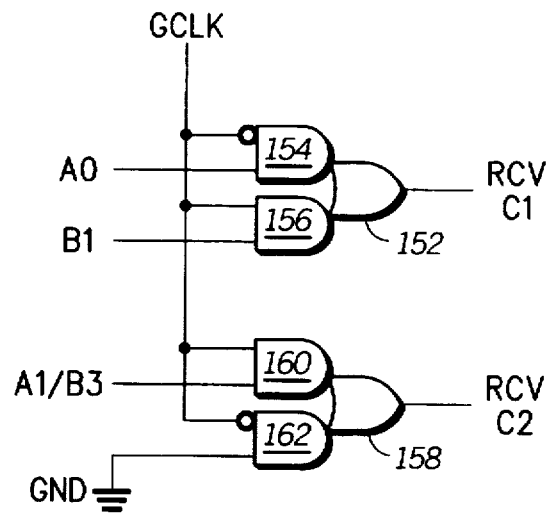

In FIG. 9, an output of an OR gate 152 generates the signal RCV C1. A first input of OR gate 152 is coupled to an output of an AND gate 154. A second input of OR gate 152 is coupled to an output of an AND gate 156. A first and a second input of AND gate 154 receive the logical complement of GCLK and A0, respectively. A first and a second input of AND gate 156 receive GCLK and B1, respectively. An output of an OR gate 158 generates the signal RCV C2. A first input of OR gate 158 is coupled to an output of an AND gate 160. A second input of OR gate 158 is coupled to an output of an AND gate 162. A first and a second input of AND gate 160 receive GCLK and A1/B3, respectively. A first and a second input of AND gate 162 receive the logical complement of GCLK and a voltage level corresponding to a low logic state (labeled "GND"), respectively.

Figure 10:
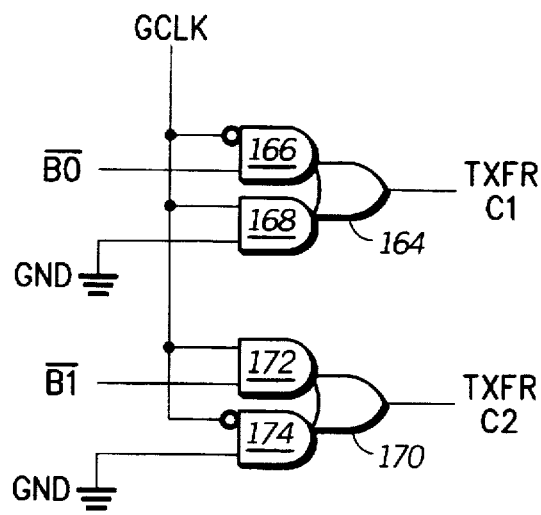

In FIG. 10, an output of an OR gate 164 generates the signal TXFR C1. A first input of OR gate 164 is coupled to an output of an AND gate 166. A second input of OR gate 164 is coupled to an output of an AND gate 168. A first and a second input of AND gate 166 receive the logical complement of GCLK and $\overline{B0}$, respectively. A first and a second input of AND gate 168 receive GCLK and the voltage level corresponding to the low logic state, respectively. An output of an OR gate 170 generates the signal TXFR C2. A first input of OR gate 170 is coupled to an output of an AND gate 172. A second input of OR gate 170 is coupled to an output of an AND gate 168. A first and a second input of AND gate 172 receive GCLK and $\overline{B1}$, respectively. A first and a second input of AND gate 168 receive the logical complement of GCLK and the voltage level corresponding to the low logic state, respectively.

Figure 11:
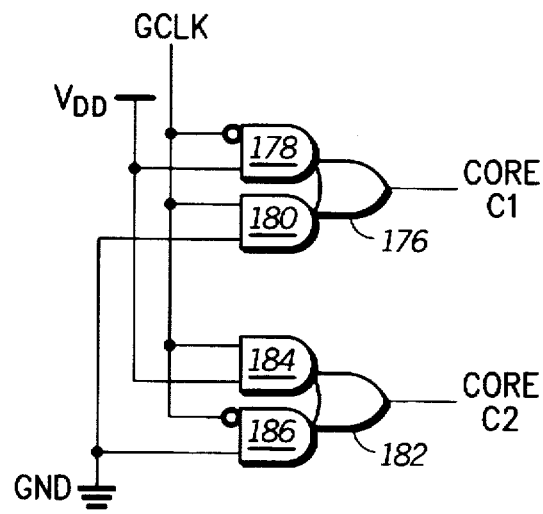

In FIG. 11, an output of an OR gate 176 generates the signal CORE C1. A first input of OR gate 176 is coupled to an output of an AND gate 178. A second input of OR gate 176 is coupled to an output of an AND gate 180. A first and a second input of AND gate 178 receive the logical complement of GCLK and a voltage level corresponding to a high logic state (labeled "$V_{DD}$"), respectively. A first and a second input of AND gate 180 receive GCLK and the voltage level corresponding to the high logic state, respectively. An output of an OR gate 182 generates the signal CORE C2. A first input of OR gate 182 is coupled to an output of an AND gate 184. A second input of OR gate 182 is coupled to an output of an AND gate 186. A first and a second input of AND gate 184 receive GCLK and the voltage level corresponding to the high logic state, respectively. A first and a second input of AND gate 186 receive the logical complement of GCLK and the voltage level corresponding to the high logic state, respectively. Core regenerator 86 contains the same number of logic gates as do bus regenerator 80, receive regenerator 82, and transfer regenerator 84 to minimize clocking skew across data processor 10.

Figure 12:
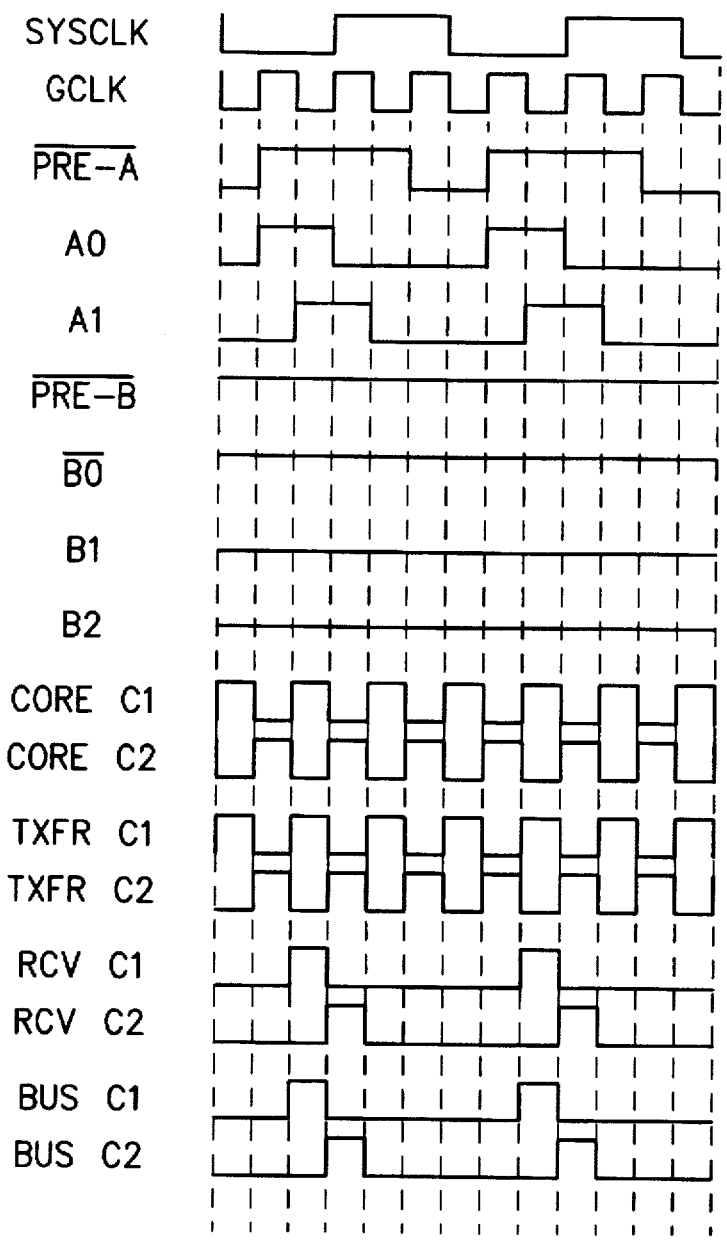
FIG. 12 depicts a timing diagram illustrating the operation of the disclosed invention in the 3:1 mode.

FIG. 12 depicts a timing diagram illustrating the operation of the disclosed invention in the 3:1 mode. Here, $\overline{PRE-A}$, A0, and A1 have a periodicity of three GCLK cycles. $\overline{PRE-B}$, B0 B1 and B2 are all static. For purposes of clearly illustrating the disclosed invention, FIG. 12 only depicts the genesis of certain exemplary C1 and C2 pulses.

As described above, BIU 12 acts as an interface between the majority of data processor 10 operating in the core-rate domain and the address and data buses operating in the bus-rate domain. Latch 38 and logic blocks 32 and 34 (shown in FIG. 3.) process data received from data processor 10 in the core-rate domain. CORE C1 and CORE C2 are generated from the two phases of GCLK. Similarly, latch 46 and logic blocks 42 and 50 process data received from the address and data buses in the bus-rate domain. BUS C1 and BUS C2 are generated from the two phases of GCLK gated by A0 and A1, respectively. As depicted, BUS C1 and BUS C2 are GCLK length pulses straddling SYSCLK rising edges.

However, if data processor 10 is to perform useful work, then it must be able to transfer data between the core-rate and bus-rate domains. Latch 40 provides a data path from the core-rate domain to the bus-rate domain. Latch 40 is clocked by TXFR C1 and TXFR C2. Similarly, latch 48 provides a data path from the bus-rate domain to the core-rate domain. Latch 48 is clocked by RCV C1 and RCV C2. As described above, data must not be transferred between core-rate and bus-rate domains during the occurrence of a half-cycle path. The transfer-rate and receive-rate domains prevent these exchanges while allowing other exchanges. In this integer core-to-bus ratio, there are no half-cycle paths between core-rate and bus-rate domains. Consequently, TXFR C1 and TXFR C2 are identical to CORE C1 and CORE C2, respectively, and RCV C1 and RCV C2 are identical to BUS C1 and BUS C2, respectively.

Figure 13:
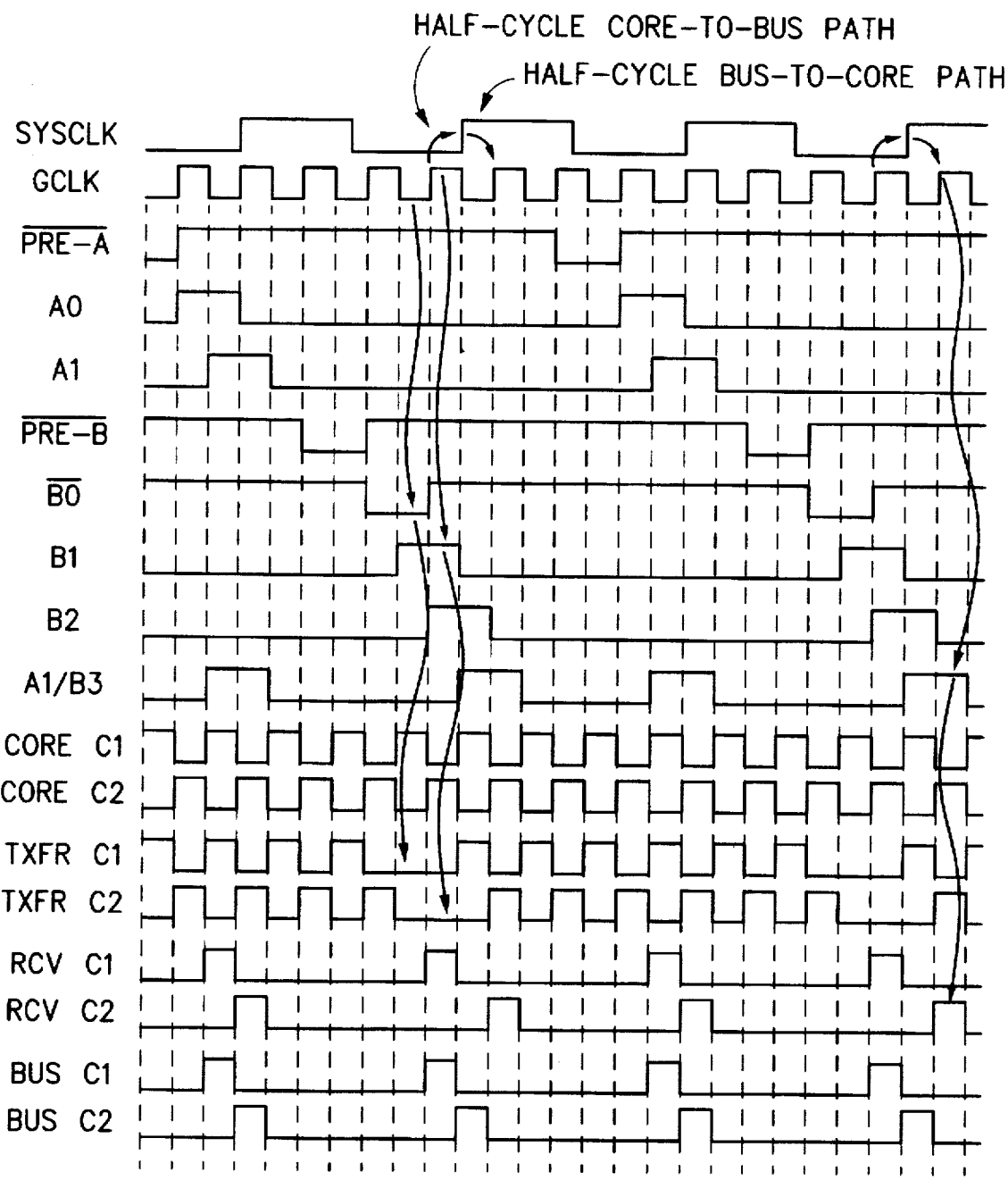
FIG. 13 depicts a timing diagram illustrating the operation of the disclosed invention in the 3.5:1 mode.

FIG. 13 depicts a timing diagram illustrating the operation of the disclosed invention in the 3.5:1 mode. In this integer plus one-half core-to-bus ratio, there are periodic half-cycle paths between core-rate and bus-rate domains. As depicted, a falling edge of GCLK aligns with a rising edge of SYSCLK every other SYSCLK cycle. Normally, a rising edge of GCLK only aligns with a rising edge of SYSCLK. (For instance, see FIG. 12.) In a half-cycle path, a signal launched during the high phase of GCLK (CORE C2) by a core-rate domain device will be sampled only one-half clock cycle later by a device operating in the bus-rate domain. Similarly, a signal launched during BUS C2 by a bus-rate domain device will be sampled only one-half clock cycle later by a device operating in the core-rate domain.

Errors may occur in data processor 10 if data is launched from latch to latch with only one-half clock cycle allowed for signal propagation. Generally, all circuits in data processor 10 are designed to operate correctly at or above a certain minimum cycle time. If signals are not allowed a full cycle to propagate through the intervening logic, then they may become unreliable. Whether a particular signal is unreliable or not in such a circumstance depends upon the complexity of the logic it flows through before reaching the next latch. If the intervening logic is simple, then the signal may propagate reliably through it in only one-half cycle. However, if the intervening logic is complicated, then the signal may require more than one-half clock cycle through which to propagate. In this case, the signal would report erroneous values if only given one-half clock cycle in which to operate.

In the case of a data transfer from core-rate domain to bus-rate domain, transfer regenerator 84 (shown in FIG. 4) swallows each TXFR C2 pulse occurring before a half-cycle path. This modification to TXFR C2 prevents latch 40 from launching data to latches 46 and 48 when the bus-rate domain circuits may latch the data too quickly. In the depicted embodiment, transfer regenerator 84 also swallows each TXFR C1 pulse occurring before the half-cycle path.

Consequently, the data output by logic block 32 is not captured by latch 40 until the beginning of SYSCLK.

In the case of a data transfer from bus-rate domain to core-rate domain, receive regenerator 82 (shown in FIG. 4) delays each RCV C2 pulse occurring during a half-cycle path. This modification to RCV C2 prevents latch 48 from launching data to latches 38 and 40 when these latches may latch the data too quickly. RCV C1 is identical to BUS C1, allowing latch 48 to capture the bus information in the bus-rate domain.

Although the present invention has been described with reference to a specific embodiment, further modifications and improvements will occur to those skilled in the art. For instance, the disclosed invention is described as an integrated portion of a data processor. However, the disclosed invention can be implemented as part of the address or data bus or as a stand alone device. Therefore, the claims shall recite a data synchronization system operating between two devices. It is to be understood therefore, that the invention encompasses all such modifications that do not depart from the spirit and scope of the invention as defined in the appended claims.

What is claimed is:

1. A data synchronization system for use with a first device and a second device, the first device operating according to a first clock signal oscillating at a first frequency, the second device operating at according to a second clock signal oscillating at a second frequency, the first frequency greater than the second frequency, the data synchronization system comprising:

a transfer latch, an input thereof receiving an output of the first device, the transfer latch capturing a data bit at the input thereof responsive to a TXFR C1 signal, the transfer latch launching the data bit responsive to a TXFR C2 signal;

a bus latch, an input thereof receiving an output of the transfer latch, an output thereof coupled to the second device, the bus latch capturing the data bit at the input thereof responsive to a BUS C1 signal, the BUS latch launching the data bit responsive to a BUS C2 signal;

a receive latch, an input thereof coupled to the output of the second device, an output thereof coupled to the first device, the receive latch capturing the data bit at the input thereof responsive to a RCV C1 signal, the receive latch launching the data bit responsive to a RCV C2 signal;

a core latch, an input thereof coupled to the output of the first device, an output thereof coupled to the first device, the core latch capturing the data bit at the input thereof responsive to a CORE C1 signal, the core latch launching the data bit responsive to a CORE C2 signal and wherein the clock generation circuitry generates the CORE C1 and CORE C2 signals: and clock generation circuitry generating the TXFR C1, TXFR C2, BUS C1, BUS C2, RCV C1, and RCV C2 signals.

2. The data synchronization system of claim 1 whereupon a coincidence of a first predetermined edge of the first clock signal and a second predetermined edge of the second clock signal, the clock generation circuitry (1) deletes an assertion of the TXFR C2 signal, and (2) delays an assertion of the RCV C2 signal for one-half cycle of the first clock signal.

3. A data processor operating according to a first clock signal oscillating at a first frequency, the data processor coupled to a bus operating according to a second clock signal oscillating at a second frequency, the first frequency greater than the second frequency, the data processor comprising:

core circuitry operating at the first frequency, the core circuitry executing received instructions from the bus and writing results to the bus;

bus interface circuitry coupling the core circuitry and the bus, the bus interface circuitry comprising a plurality of bit paths, each one of the plurality of bit paths comprising:

a transfer latch, an input thereof receiving an output of the core circuitry, the transfer latch capturing a data bit at the input thereof responsive to a TXFR C1 signal, the transfer latch launching the data bit responsive to a TXFR C2 signal;

a bus latch, an input thereof receiving an output of the transfer latch, an output thereof coupled to the bus, the bus latch capturing the data bit at the input thereof responsive to a BUS C1 signal, the BUS latch launching the data bit responsive to a BUS C2 signal;

a receive latch, an input thereof coupled to the bus, an output thereof coupled to the core circuitry, the receive latch capturing the data bit at the input thereof responsive to a RCV C1 signal, the receive latch launching the data bit responsive to a RCV C2 signal;

a core latch, an input thereof coupled to the output of the core circuitry an output thereof coupled to the core circuitry the core latch capturing the data bit at the input thereof responsive to a CORE C1 signal, the core latch launching the data bit responsive to a CORE C2 signal and wherein the clock generation circuitry generates the CORE C1 and CORE C2 signals: and clock generation circuitry generating the TXFR C1, TXFR C2, BUS C1, BUS C2, RCV C1, and RCV C2 signals.

4. The data processor of claim 3 whereupon a coincidence of a first predetermined edge of the first clock signal and a second predetermined edge of the second clock signal, the clock generation circuitry (1) deletes an assertion of the TXFR C2 signal, and (2) delays an assertion of the RCV C2 signal for one-half cycle of the first clock signal.

5. A data processor operating according to a first clock signal oscillating at a first frequency, the data processor coupled to a bus operating according to a second clock signal oscillating at a second frequency, the first frequency greater than the second frequency, the data processor comprising:

a phase detector comprising a first input and a second input, the second input coupled to the second clock signal, the phase detector generating a control signal responsive to a phase difference between the second clock signal and an input received at the first input;

clock generation circuitry coupled to the phase detector, the clock generation circuitry generating a third clock signal, a phase and a frequency of the third clock signal responsive to the control signal;

a bus regenerator coupled to the clock generation circuitry, the bus regenerator generating a BUS C1 signal and a BUS C2 signal, the BUS C1 signal and the BUS C2 signal oscillating at the second frequency, the BUS C1 signal coupled to the first input of the phase detector;

a receive regenerator coupled to the clock generation circuitry, the receive regenerator generating a RCV C1 signal and a RCV C2 signal, the RCV C1 signal and the RCV C2 signal oscillating at the second frequency, the receive regenerator delaying an assertion of the RCV C2 for one-half cycle of the first clock signal upon a coincidence of a first predetermined edge of the first clock signal and a second predetermined edge of the second clock signal;

a transfer regenerator coupled to the clock generation circuitry, the transfer regenerator generating a TXFR C1 signal and a TXFR C2 signal, the TXFR C1 signal and the TXFR C2 signal oscillating at the first frequency, the transfer regenerator deleting an assertion of the TXFR C2 upon the coincidence; and a core regenerator coupled to the clock generation circuitry, the core regenerator generating a CORE C1 signal and a CORE C2 signal, the CORE C1 signal and the CORE C2 signal oscillating at the first frequency.

* * * * *